US006165620A

United States Patent [19]

Harblin et al.

[11] Patent Number: 6,165,620

[45] Date of Patent: Dec. 26, 2000

[54] METHOD OF RESTORING DAMAGED FOUL RELEASE COATING AREA ON A METALLIC SURFACE, AND SURFACE OBTAINED THEREBY

[75] Inventors: Owen Maynard Harblin, Clifton Park; Kenneth Michael Carroll, Albany, both of N.Y.

[73] Assignee: General Electric Company, Schenectady, N.Y.

[21] Appl. No.: 09/217,882

[22] Filed: Dec. 21, 1998

[51] Int. Cl.$^{7}$ .............................. B32B 15/08; B32B 35/00

[52] U.S. Cl. .......................... 428/450; 427/140; 427/142; 427/409; 428/447; 428/448

[58] Field of Search .................................... 428/447, 448, 428/450; 427/140, 142, 409

[56] References Cited

U.S. PATENT DOCUMENTS

| | | | |
|---|---|---|---|
| 4,025,693 | 5/1977 | Milne | 428/447 |
| 4,080,190 | 3/1978 | Law et al. | 71/67 |
| 4,227,929 | 10/1980 | Law et al. | 106/1.17 |
| 5,085,894 | 2/1992 | Pascucci et al. | 427/387 |
| 5,449,553 | 9/1995 | Griffith | 428/332 |

*Primary Examiner*—D. S. Nakarani
*Attorney, Agent, or Firm*—Noreen C. Johnson; Douglas E. Stoner

[57] ABSTRACT

A method is provided for applying a two-part RTV silicone tie coat directly onto damaged foul release coating area on a metallic substrate to enable restoration procedures. The direct application onto aged epoxy or silicone surface of an effective amount of an aminoalkyltrialkoxysilane, such as γ-aminopropyltrimethoxy-silane, in a two-part RTV silicone tie coat, has been found to provide cohesive failure results with directly applied two-part RTV silicone top coat. A treated metallic substrate is obtained thereby.

14 Claims, No Drawings

METHOD OF RESTORING DAMAGED FOUL RELEASE COATING AREA ON A METALLIC SURFACE, AND SURFACE OBTAINED THEREBY

BACKGROUND OF THE INVENTION

The present invention relates to a method of treating a damaged foul release coating area on a metallic substrate, such as the surface of a ship's hull, with an organosilicon adhesion promoter composition. The application of a duplex silicone foul release coating system is made feasible after the organosilicon adhesion promoter composition is applied.

Metallic structures submerged in sea water, such as ship bottoms, are generally infested with organisms, such as barnacles, tube worms, and algae, which can become attached to the surface of these structures causing increased fuel consumption due to increased drag. Routinely, anti-fouling paints are used to treat the surface of these exposed substrates to minimize fouling attachments. Silicones have been known as effective anti-fouling coatings as early as the 1970's, as shown by U.S. Pat. Nos. 4,025,693, 4,080,190 and 4,227,929.

While silicones are recognized as effective anti-fouling coatings when in contact with sea water, silicones do not possess the anti-corrosion resistance of various organic materials, such as epoxy resins. As a result, an anti-corrosive epoxy coating is usually applied under ambient conditions onto a metallic surface of a ship's hull after it has been previously sanded to expose metal surface. Subsequent treatment with an anti-fouling coating, such as a silicone, generally requires a tie-coat to bond the silicone to the epoxy surface.

In Griffith, U.S. Pat. No. 5,449,553, which is incorporated herein by reference, a nontoxic anti-fouling system is described which involves the use of duplex silicone foul release coatings. One of the silicone coatings is a room temperature vulcanizable (RTV) composition, such as, GE RTV 11. The RTV composition is applied onto a semi-cured bonding layer which in turn can be applied onto an epoxy coating. Among the ingredients in the semi-cured bonding layer, there is included a reaction product of a hydroxy-terminated organopolysiloxane and a polymerizable monomer, such as styrene, or a conjugated diolefin, for example 1,3-butadiene. The hydroxy-terminated organopolysiloxane reaction product is combined in the absence of moisture with a partial hydrolysis product of ethyl silicate and dibutyltin butoxychloride to form a condensation cure RTV composition.

Griffith, U.S. Pat. No. 5,449,553, also shows a related semi-cured bonding layer composition referenced as Silgan J-501 of the Wacker Silicones Corporation of Adrian, Mich. Silgan J-501, also can be applied directly onto an epoxy-treated steel substrate, such as a ship's hull, and can serve as an anchor for a subsequently applied exterior silicone RTV release layer. The combination of these RTV's, which can be included under the expression "duplex silicone foul release system" has been found to be effective as a foul release system when properly secured to a ship's hull, and more particularly, to an epoxy-coated steel hull.

Experience has shown however, that while adhesion is generally satisfactory between the respective cured silicone layers, namely the silicone RTV foul release coating, and the aforementioned silicone-organic bonding layer, adhesion between the silicone bonding layer and the epoxy coating on the ship's hull requires an epoxy containing "tackcoat". As a result, a satisfactory foul release coating system for a ship's hull generally requires a multi-tier coating system consisting of an initial anti-corrosive epoxy coating, an epoxy tack or mistcoat, a silicone bonding layer, and a silicone foul release topcoat which is in direct contact with sea water. Further, satisfactory adhesion of the silicone RTV foul release topcoat generally requires a freshly applied silicone bonding layer.

As a result, if a ship suffers peripheral damage to its hull, even in a limited area, which can result in the penetration or destruction of one or more of the multi-tier silicone-epoxy coating layers, a complicated, or formidable repair procedure is often necessary. For example, restoration of the multi-tier silicone-epoxy coating layers may require the reapplication of the original anti-corrosive epoxy coating onto freshly sanded steel surface, followed by treating the epoxy layer with a tie-coat, and thereafter the application of the dual silicone foul release coating system.

It would be desirable therefor to provide a simpler patching, or repair process to allow the direct application of the duplex silicone foul release system onto the damaged area of the ship's hull in an effective manner.

BRIEF SUMMARY OF THE INVENTION

The present invention is based on the discovery that the application of a particular two-part silicone RTV composition, which includes an effective amount of an aminoalkyltrialkoxysilane, such as gamma-aminopropyltrimethoxysilane, and referred to hereinafter as "silicone adhesion promoter" can be effectively applied as a patch coat to a damaged area of a ship's hull to allow application of the duplex silicone foul release system.

It has been found, for example, that the silicone adhesion promoter can be used effectively as a "patch-coat" for the duplex silicone foul release system, even if hull damage includes exposed metal, epoxy, silicone surface, or a combination thereof. If desired, in a particular repair situation, the silicone bonding layer in the duplex silicone foul release system can be eliminated to allow direct application of the silicone RTV topcoat, which can be applied onto the freshly cured surface of the silicone adhesion promoter.

STATEMENT OF THE INVENTION

There is provided by the present invention, a method of restoring the foul release coating effectiveness of a damaged foul release coating area on a metallic substrate, which comprises, (a) treating the damaged foul release coating area under atmospheric conditions with an effective amount of an adhesion promoter composition in the form of a two-part condensation cure silicone RTV comprising (i) a silanol-terminated polydiorganosiloxane, and (ii) about 0.5% to about 5.5% based on the weight of the silanol-terminated polydiorganosiloxane of an aminoalkyltrialkoxysilane, and (b) applying as a top coat onto the treated area of (a), a two-part silicone condensation cure RTV foul release coating composition.

There is also provided by the present invention, the metallic substrate obtained by treating by the method hereinabove.

DETAILED DESCRIPTION OF THE INVENTION

The expression "two-part RTV" as used in the present invention means that liquid silicone mixtures, referred to sometimes as "part one" and "part two", can be converted from the liquid state to the elastomeric, or rubber state, when combined at room temperature.

In part one, there is generally a linear silicone polymer, such as a silanol-terminated polydiorganosiloxane, and preferably a silanol-terminated polydimethylsiloxane, along with a filler, such as calcium carbonate. In part two, there is generally the curing agent, containing at least one metal ion, such as a metallic salt of a carboxylic acid, or metallic compound, such as a tin oxide, for example, dibutyl tin oxide, in combination with a partially condensed alkylsilicate, for example, ethylsilicate. The metal ion may be present in the amount of about 0.1% to 5% by weight based on silanol-terminated polydiorganosiloxane. The alkylsilicate may be present in the amount of about 0.1% to 10% by weight based on silanol-terminated polydiorganosiloxane.

In addition to the above described ingredients, the respective parts of the two-part silicone RTV often contain major amounts of organic solvents, such as hydrocarbon solvents, for example mineral spirits, to facilitate application of these paint-like materials.

Experience has shown that unless sufficient precautions are taken, in some situations, the pot-life time, which sometimes is referred to as "work time", after part one and part two of the two-part silicone RTV composition are mixed, may be insufficient to achieve the application results desired. For example, a five minute pot-life can present a serious challenge. One procedure which can be used to extend pot-life is to employ a dual-pot pressure-fed system with an external mixing spray nozzle. Another method is to use an oxygenated solvent, or to modify the catalyst, as shown in U.S. Pat. No. 3,888,815, which is incorporated herein by reference.

While the aminoalkyltrialkoxysilane used in the practice of the invention is preferably γ-aminopropyltrimethoxysilane, other aminoalkyltrialkoxysilanes can be used such as, $NH_2RSi(OR^1)_3$, where R is methylene, dimethylene, or $C_{(4-8)}$ alkylene, and $R^1$ is $C_{(1-8)}$ alkyl.

In order that those skilled in the art will be better able to practice the invention, the following example is given by way of illustration and not by way of limitation. All parts are by weight unless otherwise indicated.

EXAMPLE

Adhesion values are obtained from a series of steel dollies imbedded into a curable two-part silicone RTV mixture applied onto steel substrates to a thickness of about 16 mils. One series uses a steel substrate coated with one-year-old epoxy resin. Another series uses a steel substrate treated with a one-year-old dual epoxy coating and a duplex silicone foul release coating which is scoured and gouged to simulate damage. The adhesion measurements are values obtained in accordance with ASTM D-4541 for portable adhesion using HATE MARK 1V test equipment of KTA Company, Pittsburgh, Pa.

The curable two-part silicone RTV mixture used in the adhesion study, is referred to hereinafter as "Exsil 2200 topcoat", and is a product of GE Silicones, Waterford, N.Y.

Prior to the application of the Exsil 2200 topcoat, the above described steel substrates are treated with a silicone adhesion promoter composition, or "patch coat" in the form of a two-part condensation cure RTV. For example, in one series, the silicone adhesion promoter composition is applied directly onto the epoxy-coated steel substrates. In a second series, the adhesion promoter is applied onto year-old multi-tiered epoxy- and silicone-coated steel substrates which are scoured and gouged to simulate damage. The two-part condensation cure RTV was applied to the substrate under atmospheric conditions, meaning under conditions of ambient temperature, pressure, and humidity.

Part one of the two-part silicone adhesion promoter, or tie coat composition, is about 40% by weight heptane and about 60% by weight of SEA 210A, a product of GE Silicones, Waterford, N.Y. SEA 210A consists of about 25% by weight of a 3000 centipoise silanol-terminated polydimethylsiloxane, 25% by weight of a 30,000 centipoise silanol-terminated polydimethylsiloxane, and 50% by weight of precipitated stearic acid-treated $CaCO_3$. Part two of the silicone adhesion promoter composition consists of 62% of mineral spirits, 11.3% of partially condensed ethyl silicate, 3.8% of solubilized dibutyl tin oxide, and 22.5% of γ-aminopropyltrimethoxysilane. If desired, a minor amount of a dye can be used as an indicator to facilitate degree of mixing uniformity.

The following shows the adhesion results obtained using the steel dollies which are immersed in the Exsil 2200 topcoat referred to as "topcoat". The silicone adhesion promoter, which is applied prior to the topcoat onto the respective steel substrates, is referred to as "tiecoat". The steel substrates include the epoxy-coated steel substrates, or "epoxy/steel", and the epoxy-duplex-silicone coated steel substrates, or "epoxy-silicone/steel". The total cure time is shown as 18 hours which covers the period between silicone RTV application and test measurements.

Under "Type of Failure", adhesive means a clean separation between topcoat and tiecoat, and cohesive means that a breakdown in the topcoat wall occurs instead of separation between topcoat and tiecoat.

| Steel Substrates | Adhesion (psi) [avg. 2 tests] | Type of Failure [adhesive or cohesive] |
|---|---|---|
| 18 hr cure | 375 | cohesive |
| epoxy/steel | | |
| +1 week saltbath | 375 | cohesive |
| +3 weeks saltbath | 400 | cohesive |
| epoxy-silicone/ steel | 313 | cohesive |

The above results show that the two-part condensation cure RTV referred to as adhesion promoter, or tiecoat, can be used to repair damaged silicone foul release coatings on hulls of ships. In contrast to the above cohesive failure results, similar patch studies using the topcoat directly on old epoxy surfaces, or old duplex foul release silicone surfaces, without the tiecoat resulted in adhesive failure.

What is claimed is:

1. A method of restoring the foul release effectiveness of a damaged foul release coating area on a metallic substrate, which comprises, (a) treating the damaged foul release coating area under atmospheric conditions with an effective amount of an adhesion promoter composition in the form of a two-part condensation cure silicone RTV comprising (i) a silanol-terminated polydiorganosiloxane, and (ii) about 0.5% to about 5.5% based on the weight of the silanol-terminated polydiorganosiloxane of an aminoalkyltrialkoxysilane, and (b) applying as a top coat onto the treated area of (a), a two-part silicone condensation cure RTV foul release coating composition.

2. A method in accordance with claim 1, where the two-part condensation cure silicone RTV adhesion promoter contains 0.1% to 10% by weight of an alkylsilicate, and 0.1% to 5% by weight of metal ion based on silanol-terminated polydiorganosiloxane.

3. A method in accordance with claim 1, where the two-part condensation cure RTV foul release coating composition applied in step (b) comprises a duplex foul release coating consisting of a silicone RTV bonding layer, and a silicone RTV topcoat.

4. A method in accordance with claim 3, where the silicone RTV bonding layer in the duplex foul release coating comprises a silanol-terminated reaction product of a polymerizable monomer and a hydroxy-terminated polydimethylsiloxane.

5. A method in accordance with claim 1, where the aminoalkyltrialkoxysilane is γ-aminopropyltrimethoxysilane.

6. A method in accordance with claim 1, where the two parts of the silicone RTV adhesion promoter are sprayed, as a single organic solvent freshly prepared blend, onto the damaged foul release coating area.

7. A method in accordance with claim 1, where the metallic substrate is a ship's hull.

8. A method of restoring the foul release effectiveness of a damaged foul release coating area on a metallic substrate, which comprises, (a) treating the damaged foul release coating area under atmospheric conditions with effective amount of an adhesion promoter composition in the form of a two-part condensation cure silicone RTV comprising (iii) a silanol-terminated polydimethylsiloxane, and (iv) about 0.5% to about 5.5% based on the weight of the silanol-terminated polydimethylsiloxane of γ-aminopropyltrimethoxysilane, and (b) applying a two-part silanol condensation cure RTV foul release coating composition onto the treated area of (a).

9. A method in accordance with claim 8, where the adhesion promoter composition has an effective amount for curing of ethylsilicate and dibutyl tin oxide.

10. A method in accordance with claim 8, where a duplex silicone foul release coating is applied onto the surface of the adhesion promoter composition.

11. A method in accordance with claim 8, where the adhesion promoter is sprayed onto the damaged area using a two component spraygun with an external mixing spray nozzle.

12. A method in accordance with claim 8, where the metallic substrate is a ship's hull.

13. A metallic substrate obtained by the steps of (a) treating a damaged foul release coating area thereon under atmospheric conditions with an adhesion promoting amount of an adhesion promoter composition in the form of a two-part condensation cure silicone RTV comprising (iii) a silanol-terminated polydimethylsiloxane, and (iv) about 0.5% to about 5.5% based on the weight of the silanol-terminated polydimethylsiloxane of γ-aminopropyltrimethoxysilane, and (b) applying a two-part silanol condensation cure RTV foul release coating composition onto the treated area of (a).

14. The metallic substrate in accordance with claim 13, which is a ship's hull.

* * * * *